United States Patent [19]

Samura et al.

[11] 4,026,829

[45] May 31, 1977

[54] FLEXIBLE POLYURETHANE FOAM

[75] Inventors: Tetsuya Samura, Uji; Isao Ishikawa, Takatsuki; Kozaburo Nagata, Kusatsu, all of Japan

[73] Assignee: Sanyo Chemical Industries, Ltd., Kyoto, Japan

[22] Filed: Aug. 4, 1975

[21] Appl. No.: 601,792

[30] Foreign Application Priority Data

Aug. 6, 1974 Japan .............................. 49-90369

[52] U.S. Cl. ..................... 260/2.5 AP; 260/2.5 AJ; 260/2.5 AT
[51] Int. Cl.$^2$ ......................................... C08G 18/14
[58] Field of Search ............... 260/2.5 AP, 2.5 AT, 260/2.5 AJ

[56] References Cited

UNITED STATES PATENTS

| 3,637,536 | 1/1972 | Ring et al. ..................... 260/2.5 AT |
| 3,832,311 | 8/1974 | Windemuth et al. ......... 260/2.5 AJ |
| 3,879,316 | 4/1975 | Fishbein et al. .............. 260/2.5 AT |

FOREIGN PATENTS OR APPLICATIONS 980,021 1/1965 United Kingdom .......... 260/2.5 AP

*Primary Examiner*—Eugene C. Rzucidlo
*Attorney, Agent, or Firm*—Oblon, Fisher, Spivak, McClelland & Maier

[57] ABSTRACT

A flexible polyurethane foam which produces a reduced amount of smoke when in contact with a flame and which has flame resistant properties is produced by reacting, under foaming conditions, a polyetherpolyol having a hydroxyl number of 25 – 80 and, a primary hydroxyl group content of at least 10% and a liquid mixture of a polyoxyethylenepolyol modified polyisocyanate and a polyisocyanate monomer.

11 Claims, No Drawings

FLEXIBLE POLYURETHANE FOAM

BACKGROUND OF THE INVENTION

1. Field of the Invention

This invention relates to flexible polyurethane foams. More particularly, it relates to flexible polyurethane foams having reduced smoke generation when in contact with a flame and having flame retardant properties, and a process of making the same.

2. Description of the Prior Art

Heretofore, polyurethane foams have been produced by reacting, under foaming conditions, a compound containing a plurality of active hydrogen atoms with a polyisocyanate. The resulting foams often have no flame resistance and release smoke in large amounts when in contact with a flame.

It has also been known to produce flame resistance polyurethane foams by incorporation therein of a flame retarding compound which contains phosphorus or halogen atoms. While it is thus possible to reduce the flammability of the foamed polyurethane, the resultant product still has disadvantageous such as (1) deterioration of the flame retarding property caused by bleeding out or evaporation of the flame retarding compound; (2) an adverse effect of the compound on some of the physical properties of the foamed product; and (3) occurrence of scorching. Another serious defect encountered when the foamed product is on fire, is the generation of a large amount of smoke as well as poisonous gases containing halogen or phosphorus compounds.

It has also been proposed to reduce the flammability and the amount of smoke generated by polyurethane foams without incorporation of a flame retarding compound. In these processes, for example, there is used a polyisocyanate compound having a biuret linkage or a compound having an isocyanurate ring. The resultant products are improved in most of the above-mentioned properties, but their structure consists of closed cells. Consequently, in order to prevent collapse of the foam, the structure must be changed to an open cell by unpractical methods such as the mechanical crushing of the cells. As a result, a fully satisfactory technique for rendering polyurethane foams fire retardant and for reducing the amount of smoke generated by the foams when in contact with a flame is needed.

SUMMARY OF THE INVENTION

Accordingly, it is an object of the present invention to provide improved flexible polyurethane foams producing a reduced amount of smoke when in contact with a flame and having flame resistance, and to provide a process for producing the same.

This and other objects of this invention as will hereinafter become clear from the ensuing discussion have been attained by providing a process of producing a flexible polyurethane foam from (1) a polyetherpolyol, (2) a polyisocyanate, and (3) additives such as a catalyst and a foaming agent, by using, as the above polyetherpolyol, a polyetherpolyol having a hydroxyl number of 25 – 80 and a primary hydroxyl group content of at least 10% based on the total number of hydroxyl groups, and by using, as the above polyisocyanate, a liquid mixture of a polyoxyethylenepolyol modified polyisocyanate and a polyisocyanate monomer.

DETAILED DESCRIPTION OF THE PREFERRED EMBODIMENTS

In this invention is used a polyetherpolyol having a hydroxyl number of 25 – 80 and a primary group content of at least 10% based on the total number of hydroxyl groups. Such a polyetherpolyol forms a urethane foam having a reduced amount of smoke generated by flame contact and has flame resistance when formed in combination with the polyisocyanate component mentioned below. Preferred polyetherpolyols have an hydroxyl number of 30 – 70 and a primary hydroxyl group content of 10 – 50%.

Methods of preparation of the polyetherpolyols of this invention are known in the field of flexible polyurethane foams. For example, they may be produced by adding an alkylene oxide to a compound having at least two active hydrogen atoms in a conventional manner. Suitable active hydrogen-containing compounds include polyhydroxyl alcohols, polyhydric phenols, amines and water. Suitable polyhydric alcohols include ethylene glycol, 1,2-propanediol, 1,6-hexanediol, glycerine, trimethylolpropane, pentaerythritol, sorbitol, and mixtures thereof. Suitable polyhydric phenols include resorcine, hydroquinone and 3-hydroxyl-2-naphthol. Suitable amines include ammonia, lower ($C_1 - C_4$) alkylamines (such as methyl and ethylamines), alkylene diamines (such as ethylene diamine, propylene diamine, and hexamethylene diamine), polyalkylene polyamines (such as diethylene triamine), alkanol amines (such as mono-, di- and triethanol amines), xylyene diamine, aminoethyl piperadine, phenylene diamine, benzidine and toluidine. The preferred active hydrogen-containing compounds are the polyhydric alcohols and amines having 2 to 4 active hydrogen atoms. Suitable alkylene oxides include ethylene oxide, propylene oxide, butylene oxide, tetrahydrofuran, styrene oxide and epichlorohydrine. Mixtures thereof may also be used in random or block addition. The preferred components are combinations of ethylene oxide with other alkylene oxides in a weight ratio of 5 – 30 : 95 – 70. Introduction of the primary hydroxyl groups into the polyetherpolyol is preferably made by the addition of ethylene oxide. The molecular weight of the polyetherpolyol is not critical. It is generally at least 500 per hydroxyl group, preferably 1,000 – 3,000.

The above polyetherpolyol may be used alone or in combination with a conventional active hydrogen-containing compound having at least two active hydrogen atoms and having low to high molecular weight. Suitable compounds having such a low molecular weight (up to 200) include polhydric alcohols (such as ethylene glycol, diethylene glycol, 1,4-butylene glycol, glycerine and trimethylolpropane), and polyamines (such as 4,4'-diaminoidphenylmethane and 2,4- or 2,6-diaminotoluene. Suitable compounds having such a high molecular weight (200 – 10,000) are polyetherpolyols having less than 10% by weight of a primary hydroxyl group, polyesterpolyols, polyetheresterpolyols and polythioetherpolythiols. These compounds may be used in an amount of less than 30% by weight based on the total weight of active hydrogen containing compounds.

The polyisocyanate component used in this invention is a liquid mixture of a polyoxyethylene polyol modified polyisocyanate and a polyisocyanate monomer (hereinafter referred to as the NCO mixture). The polyoxethylenepolyol is an addition product of ethylene oxide and a compound having at least two active hydrogen atoms, suitable examples of which are given above with regard to the preparation of the polyetherpolyol of this invention. The preferred compounds are polyols such as ethylene glycol, propylene glycol, glycerine, trimethylolpropane, pentaerythritol, sorbitol and mixtures thereof. The molecular weight of the polyoxyethylenepolyol is preferably 100 – 1,000, more preferably 200 – 600. Suitable polyisocyanates for use in the modification and as the polyisocyanate monomer include, independently, 2,4- or 2,6-tolylene, 1,4-tetramethylene, 1,6-hexamethylene, diphenylmethane-4,4'-, m- or p-xylylene, cyclohexane-1,3 or 1,4-, 1-methylcyclohexane-2,4- or -2,6-,naphthalene-1,5-, isophorone diisocyanates, triphenylmethane-4,4', 4" triisocyanate, and mixtures thereof such as an 80 : 20 by weight mixture of 2,4- and 2,6-tolylene diisocyanates. There also may be used other conventional polyisocyanates conventionally employed in the production of polyurethane foams such as polyphenylpolymethylene polyisocyanates which are obtained by the phosgenation of aniline-formaldehyde condensation products.

The modified polyisocyanate is present in the NCO mixture in the form of an NCO-rich prepolymer. (Even if an OH-rich prepolymer is used, it will react with the polyisocyanate monomer to make an NCO-rich prepolymer in the NCO mixture). The NCO content of the NCO-rich prepolymer in the NCO mixture is not critical. Typically, the content is 5 – 25% by weight, preferably 10 – 20% by weight. The total NCO content of the NCO mixture is also not critical. It is generally 20 – 45% by weight of the total mixture, preferably 25 – 40% by weight. The NCO mixture is generally used in the liquid form in order to facilitate foaming. It is generally produced in a single step by reacting polyoxyethylenepolyol with a large excess of polyisocyanate monomer. It may also be produced by mixing the modified polyisocyanate with the monomer.

Other components suitable for use in this invention, such as a foaming agent and a catalyst, are those used in conventional flexible urethane foams. Optionally, there may be included a foam stabilizer, a fire proofing additive and/or other conventional additives. Suitable foaming agents include water and fluorinated hydrocarbons such as monofluorotrichloromethane and difluorodichloromethane. Suitable catalysts include amino compounds such as trimethyl amine, dimethylbenzyl amine, N-ethylmorpholine, triethylene diamine (and its formic acid salt), dimethylpiperazine, 1,2-dimethylimidazole, dimethylaminoethanol, diethanol amine, triethanol amine, diethylaminoethanol, 1,8-diazabicyclo (5, 4, 0) undecene-7 (and its phenol salt) and tin compounds such as dibutyl tin dilaurate and stannous octoate. Suitable foam stabilizers include silicones and other surface active agents. In the production of the flexible polyurethane foams of this invention form the above-mentioned ingredients, conventional techniques used in the production of conventional flexible urethane foams may be used. The raw materials of this invention are mixed in a suitable order in the proper amounts at room or elevated temperatures, and the resulting mixture is allowed to foam.

The flexible urethane foam of this invention has significant advantages. It produces a reduced amount of smoke generated by flame contact and has flame retardant properties. Additionally, its foam structure is that of an open cell foam which does not collapse. Additionally, the process of this invention has no adverse effect on the physical properties of the foam products.

Having generally described the invention, a more complete understanding can be obtained by reference to certain specific examples, which are included for purposes of illustration only and are not intended to be limiting unless otherwise specified.

EXAMPLE 1

95 parts (by weight) of polyetherpolyol, obtained by adding propylene oxide to glycerine followed by tipping with ethylene oxide so that approximately 30% primary hydroxyl groups were in the end position with an OH number of 56, 5.0 parts of ethylene glycol, 4.5 parts of water, 0.2 part of triethylenediamine and 2.0 parts of the triethylenediamine salt of formic acid were mixed together. They were reacted with 83.0 parts of an NCO mixture (NCO content 40%) which had been produced in a single step by reacting polyoxethylenepolyol (an ethylene oxide adduct of glycerine having molecular weight of 600) with an isomeric tolylene diisocyanate mixture (80% 2,4- and 20% 2,6-isomer) [hereinafter referred to as TD1-80]. There was obtained a flameproof foam which had the mechanical and flameproof properties shown in Table 1.

EXAMPLE 2

100 parts of polyetherpolyol, obtained by adding propylene oxide to glycerine followed by tipping with ethylene oxide so that there were approximately 30% primary hydroxyl groups in the end position with an OH number of 37, 3.5 parts of water, 0.1 part of triethylenediamine, 0.3 part of silicone oil, 1.0 part of the triethylenediamine salt of formic acid and 5.0 parts of monofluorotrichloromethane were mixed together. They were reacted with 66.9 parts of an NCO mixture (NCO content 30%) obtained by reacting polyoxyethylenepolyol (an ethylene oxide adduct of glycerine having a molecular weight of 600) with TDT-80. There was obtained a flameproof foam which had the mechanical and flameproof properties shown in Table 1.

EXAMPLE 3

96 parts of polyetherpolyol, obtained by adding propylene oxide to glycerine followed by tipping with ethylene oxide so that there were approximately 30% primary hydroxyl groups in the end position with an OH number of 32, 4.0 parts of trimethylolpropane, 5.0 parts of water, 0.1 part of triethylenediamine salt of formic acid and 0.1 part of silicone oil were mixed together. They were reacted with 101.5 parts of an NCO mixture (NCO content 30%) obtained by reacting polyoxyethylene glycol (molecular weight of 200) with TDI-80. There are obtained a flameproof foam which had the mechanical and flameproof properties shown in Table 1.

EXAMPLE 4

97 parts of polyetherpolyol, obtained by adding propylene oxide to glycerine followed by tipping with ethylene oxdide so that there were approximately 35% primary hydroxyl groups in the end position with an OH number of 56, 3 parts of trimethylolpropane, 4.5 parts of water, 0.1 part of triethylenediamine, 0.7 part of silicone oil, 0.5 part of SA No. 1 (the 1,8-diaza-bicyclo(5, 4, 0) undecene-7 salt of phenol, manufactured by San Abbott Ltd.) were mixed together. They were reacted with 72 parts of an NCO mixture (NCO content 40%) obtained by reacting polyoxyethylene glycol (molecular weight: 200) with TDI-80. There was obtained a flameproof foam which had the mechanical and flameproof properties shown in Table 1.

EXAMPLE 5

95 parts of polyetherpolyol, obtained by adding propylene oxide to triethanolamine followed by tipping with ethylene oxide so that there were approximately 25% primary hydroxyl groups in the end position with an OH number of 28, 5 parts of diethylene glycol, 3.5 parts of water, 0.1 part of triethylenediamine, 1.0 part of silicone oil and 0.5 part of triethylamine were mixed together. They were reacted with 78 parts of an NCO mixture (NCO content 30%) obtained by reacting polyoxyethylene glycol (molecular weight: 200) with TDI-80. There was obtained a flameproof foam which had the mechanical and flameproof properties shown in Table 1.

EXAMPLE 6

95 parts of polyether polyol, obtained by the same method as in Example 5, 5.0 parts of diethylene glycol, 4.0 parts of water, 0.1 part of triethylenediamine, 5 parts of monofluorotrichloromethane and 1 part of silicon oil were mixed together, and reacted with 64.6 parts of an NCO mixture (NCO content 40%) obtained by reacting polyoxethylenepolyol (an ethylene oxide adduct of pentaerythritol having molecular weight: 400) with TDI-80. There was obtained a flameproof foam which had the mechanical and flameproof properties shown in Table 1.

EXAMPLE 7

100 parts of polyetherpolyol, obtained by adding propylene oxide to glycerine followed by tipping with ethylene oxide so that there were approximately 20% primary hydroxyl groups in the end position with an OH number of 56, 5 parts of water, 0.1 part of triethylenediamine, 0.1 part of silicon oil and 1.0 part of the triethylenediamine salt of formic acid were mixed together. They were reacted with a mixture of 86.7 parts of an NCO mixture, NCO content 30%, obtained by reacting polyoxyethylene glycol (ethylene oxide adduct of ethylene glycol having a molecular weight of 200) with TDI-80, and 9.6 parts of crude 4,4'-diphenylmethanediisocyanate (crude MDI). There was obtained a flameproof foam which had the mechanical and flameproof properties shown in Table 1.

foams of this invention produced by the methods of Examples 2 and 5 in comparison with a conventional flameproof foam which contained a flame retarding compound produced as follows:

Table 2

|  | Foam in Example 2 | Foam in Example 5 | Foam containing a flame retarding compound |
|---|---|---|---|
| Sample (g) Total | 32 | 30 | 16 |
| Fuming factor ($C_A$) | 51 | 66 | 63 |
| Fuming factor per weight of the sample ($C_A/g$) | 1.6 | 2.2 | 3.9 |

80 parts of polyether polyol (OH number: 56), obtained by adding propylene oxide to glycerine followed by tipping with ethylene oxide, 20 parts of a flame-retarding compound (phosphate type), 3.0 parts of water, 0.1 part of triethylenediamine, 0.5 part of triethylamine, 1.0 part of silicone L-520 (manufactured by Union Carbide Corporation) and 0.24 part of a catalyst of an organic tin compound type were mixed together, and reacted with TDI-80. The resultant foam had the following mechanical and flameproof properties.

| | |
|---|---|
| Density (Kg/m³) | 33.1 |
| Tensile strength (Kg/cm²) | 0.75 |
| Elongation (%) | 101 |
| Inflammability according to ASTM D-1692-67T | |
| Length of burnt sample (cm) average value | 3.5 |
| Average extinction time (sec) | 18 |
| Assessment | self-extinguishing |

Table 2 shows that the flameproof foams of this invention are superior to the conventional flameproof foam containing the flame retarding compound with regard to the ability to resist fuming. (Note that lower unit fuming factors correspond to lesser amounts of smoke generated).

Having now fully described the invention, it will be apparent to one of ordinary skill in the art that many changes and modifications can be made thereto without departing from the spirit or scope of the invention as set forth herein.

What is claimed as new and desired to be secured by Letters Patent of the U.S. is:

1. In a process for producing a flexible polyurethane foam by reacting a polyetherpolyol and a polyisocyanate in the presence of a catalyst and a foaming agent, the improvement which comprises using, as the polyetherpolyol, a polyetherpolyol having an hydroxyl number of 25 – 80 and a primary hydroxyl group content of Table 1

| | Flameproof foam | Example 1 | Example 2 | Example 3 | Example 4 | Example 5 | Example 6 | Example 7 |
|---|---|---|---|---|---|---|---|---|
| Density (Kg/m³) | | 26.0 | 35.0 | 27.2 | 24.7 | 31.0 | 23.2 | 29.0 |
| Tensile strength | (Kg/cm²) | 1.2 | 1.3 | 1.32 | 1.0 | 1.32 | 0.92 | 1.0 |
| Elongation (%) | | 170 | 130 | 170 | 150 | 163 | 162 | 95 |
| Inflammability ASTM D-1692-67T | Length of burnt sample (cm average value | 1.8 | 3.6 | 3.8 | 4.9 | 5.3 | 6.2 | 7.5 |
| | Average extinction time (sec) | 11.2 | 16 | 16 | 19 | 21 | 23 | 27.5 |
| | Assessment | self-extinguishing | self-extinguishing | self-extinguishing | self-extinguishing | self-extinguishing | self-extinguishing | self-extinguishing |

EXAMPLE 8

(Fuming test)

Fuming tests (smoke generation tests) were conducted according to the method of JIS (Japanese Industrial Standard) A-1321, with each of the flameproof at least 10% based on the total hydroxyl group content, and using, as the polyisocyanate, a liquid mixture of a polyisocyanate modified by reaction with a polyoxyethylenepolyol having a molecular weight of 200 – 600 and a polyisocyanate monomer.

2. The process of claim 1, wherein the hydroxyl number is 30 – 70 and the primary hydroxyl group content is 10 – 50%.

3. The process of claim 1, wherein the polyetherpolyol is an alkylene oxide adduct with a compound having at least two active hydrogen atoms.

4. The process of claim 1, wherein the polyetherpolyol is one tipped with ethylene oxide.

5. The process of claim 1, wherein the polyetherpolyol has a molecular weight of 1,000 – 3,000 per hydroxyl group.

6. The process of claim 1, wherein the polyetherpolyol is used in a mixture with other compounds having at least two active hydrogen atoms.

7. The process of claim 1, wherein the liquid mixture has an NCO content of 20 – 45% by weight based on the weight of the total mixture.

8. The process of claim 1, wherein the liquid mixture is one produced in a single step by reacting the polyoxyethylenepolyol with a large excess of polyisocyanate monomer.

9. The process of claim 1, wherein said polyetherpolyol is used in admixture with a compound having at least two active hydrogen atoms, a molecular weight of up to 200 and which is selected from the group consisting of polyhydric alcohols and polyamines.

10. The process of claim 9, wherein said compound having at least two active hydrogen atoms is diethylene glycol.

11. The flexible polyurethane foam produced by the process of claim 1.

* * * * *